United States Patent [19]

McCrink

[11] Patent Number: 5,485,948
[45] Date of Patent: Jan. 23, 1996

[54] SHAFT AND METHOD OF MAKING SAME

[76] Inventor: Edward J. McCrink, P.O. Box 1429, Rancho Sante Fe, Calif. 92067

[21] Appl. No.: 97,466

[22] Filed: Jul. 26, 1993

[51] Int. Cl.$^6$ .......................... B23K 101/04; B23K 31/02
[52] U.S. Cl. .......................... 228/126; 228/131; 138/131; 138/139
[58] Field of Search .................................. 228/132, 126, 228/131; 273/80 B, 80 R; 138/131, 139

[56] References Cited

U.S. PATENT DOCUMENTS

| 1,000,627 | 8/1911 | Rudolph | 138/131 |
|---|---|---|---|
| 1,950,342 | 3/1934 | Meshel | 273/80 |
| 1,994,069 | 3/1935 | Fletcher | 273/80 |
| 2,573,361 | 10/1951 | Rodgers, Jr. et al. | 273/80 B |
| 3,762,707 | 10/1973 | Santorelli | 273/80 |
| 4,363,435 | 12/1982 | Broodman | 228/131 |
| 4,743,137 | 5/1988 | Bucher et al. | 228/132 |

FOREIGN PATENT DOCUMENTS 62-176691  8/1987  Japan ..................................... 228/126

Primary Examiner—P. Austin Bradley
Assistant Examiner—Jeffrey T. Knapp
Attorney, Agent, or Firm—Timothy J. King

[57] ABSTRACT

A shaft for such items as sporting goods, including golf clubs fishing rods bicycle frames, and ski poles is constructed of metallic tubular structures. The hollow tubular shaft is brazed to a helical coil of reinforcing wire which fits snugly against the inside surface of the shaft. Brazing is accomplished by fitting the helical reinforcing wire into the tubular shaft and placing the assembly inside a controlled atmosphere or vacuum furnace where heat is applied to initiate the brazing function. By using appropriate metals and alloys the brazing and hardening is accomplished simultaneously without the use of flux. The proper choice of metals and the gauge of the metals ensures the desired strength, rigidity, and torsional characteristics of the shaft.

2 Claims, 1 Drawing Sheet

U.S. Patent Jan. 23, 1996 5,485,948
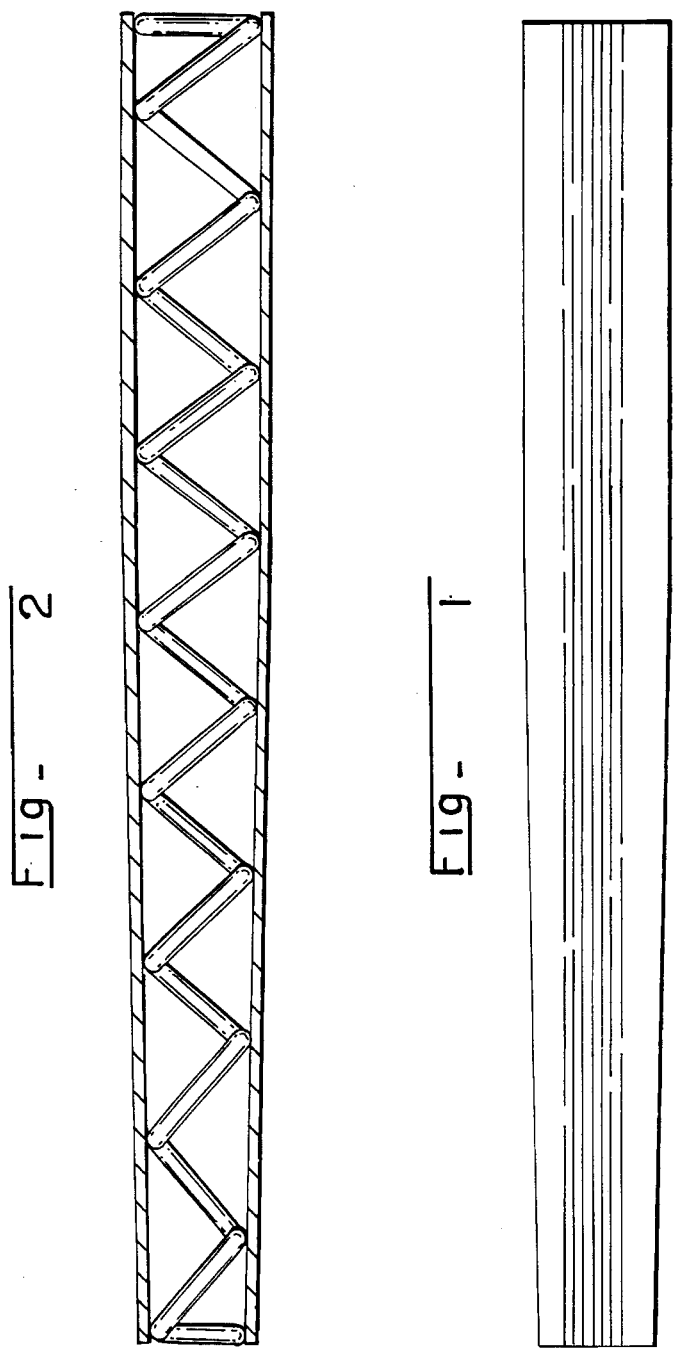
Fig - 2
Fig - 1
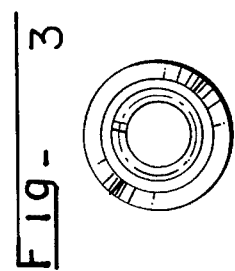
Fig - 3

SHAFT AND METHOD OF MAKING SAME

BACKGROUND OF THE INVENTION

1. Field of the Invention

This invention relates to shafts and handles of a variety of sporting goods and light weight tubular structural components, and most particularly it relates to metallic tubular shafts as used on golf clubs, ski poles and fishing rods.

Shafts of this type are commonly constructed of steel and aluminum and composites and are objectionable for several reasons, including weight, rigidity, or they do not have the desired flexibility and torque resistance which is essential in shafts of this type. There have been many structural improvements in shaft construction, including reinforcing the tubular shafts with metallic compressible tubular materials having a plurality of re-entrant portions extending longitudinally and separated by longitudinally extending ribs and by filling the hollow shaft with plastic material or sponge rubber. The instant invention offers a method for reinforcing shafts by furnace or vacuum brazing a helical wire portion inside the shaft.

2. Description of the Related Art

A pertinent prior art reference is U.S. Pat. No. 1,994,069 issued in 1935 to C. T. Fletcher, which describes a tubular metallic shaft closely simulating the wooden shaft used on a golf club, and interiorly reinforcing it with a convoluted material having re-entrant portions extending longitudinally thereof and separated by longitudinal ribs. U.S. Pat. No. 1,950,342 issued in 1934 to Irving Meshel which describes a hollow tubular metallic "steel" shaft with a core of sponge rubber. U.S. Pat. No. 3,762,707 issued in 1973 to Salvatore Santorelli, which describes a golf club comprising a hollow shaft with a grip at one end and a golf head attached to the other end. The shaft is made of a material to impart a predetermined flexibility to the shaft. The shaft is partially filled from the attachment and up to a predetermined distance within the shaft, with a manually flexible plastic material.

SUMMARY OF THE INVENTION

The instant invention describes an air hardening stainless steel shaft, such as a golf club shaft, enclosing a wire coiled helix of reinforcing metal inserted therein. The reinforcing helix made from wire wound with an outside diameter compatible with the inside diameter of the shaft The cross sectional shape of the shaft is generally round to oval and tapered in length. In the specific modification of this invention, as applied to a golf club, the shaft and reinforcing wire is made from an air hardening material such as 410 stainless steel. Assembly of the golf club shaft begins with inserting the helix within the shaft, then placing the assembly in a controlled atmosphere or a vacuum furnace and applying brazing material and heat to braze the wire helix outside dimension at all points of contact with the inside surface of the metallic shaft. This method of brazing eliminates the need of a brazing flux and provides a metallurgically strong joint. Other metals and alloys of metal that will braze in a vacuum or atmosphere furnace can be used to fabricate shafts with due regard to the strength required. Tubular metallic shafts for sporting goods possessing the desired weight and balance and the necessary strength, rigidity and torsional characteristics are produced by the above described method of fabrication.

BRIEF DESCRIPTION OF THE DRAWINGS

FIG. 1 is a plan view of a portion of a golf club shaft;

FIG. 2 is a partially sectioned view of FIG. 1;

FIG. 3 is a left end view of FIG. 1.

DETAILED DESCRIPTION OF THE PREFERRED EMBODIMENTS

FIG. 1 illustrates a longitudinal portion of a tapered golf club shaft 1. FIG. 2 shows the inserted wire helix 2 pressing against, and brazed to, the inside surface of the metallic shaft. FIG. 3 is a left end view of FIG. 1. The method of fabricating a brazed reinforced shaft begins with: drawing the shaft with an appropriate die or tapered tubing winding the reinforcing wire into a helix, inserting the wire helix into the shaft, placing the shaft assembly into a controlled atmosphere or vacuum furnace, applying brazing material and heat to the assembly to braze the wire to the contacting surface of the inside surface of the shaft. For the specific modification of the invention as applied to a golf club the shaft is fabricated from air hardening 410 stainless steel and the reinforcing wire made from 410 stainless steel also. The gauges of stainless steel used in the reinforcing wire and the shaft are selected to provide a desired strength and flexibility of the finished golf club.

I claim:

1. A reinforced stainless steel shaft comprising:

a tubular shaft made from air hardening stainless steel;

a coil of air hardening stainless steel wire, said coil forming a tight fit between the outside diameter of the coil and the internal diameter of the shaft; and brazing material proximal to the loci of intersections of the coil with the tubular shaft.

2. A method for constructing a shaft comprising the steps of:

fabricating a tubular shaft from air hardening stainless steel;

winding an air hardenable stainless steel wire into a coiled helix;

winding the outside diameter of the helix to fit tightly to the inside diameter Of the stainless steel shaft;

inserting the helical winding into the shaft;

placing the shaft assembly with brazing material into a controlled atmosphere or vacuum furnace; and applying sufficient heat for the proper time to braze the wire helix to the inside surface of the shaft simultaneously hardening both the helix coil wire and the shaft.

* * * * *